(12) United States Patent
Kim et al.

(10) Patent No.: US 6,617,995 B2
(45) Date of Patent: Sep. 9, 2003

(54) RADAR DETECTOR

(75) Inventors: Jong-Kui Kim, Seoul (KR); Sang-Bo Min, Seoul (KR); Jae-Seok Oh, Seoul (KR); Dong-Gi Youn, Seoul (KR); Keun-Sik No, Gyeonggi-do (KR)

(73) Assignee: Microline Co., Ltd., Seoul (KR)

( * ) Notice: Subject to any disclaimer, the term of this patent is extended or adjusted under 35 U.S.C. 154(b) by 0 days.

(21) Appl. No.: 10/202,304

(22) Filed: Jul. 24, 2002

(65) Prior Publication Data

US 2003/0058154 A1 Mar. 27, 2003

(30) Foreign Application Priority Data

| Sep. 24, 2001 | (KR) | .......... 2001-59165 |
| Sep. 24, 2001 | (KR) | .......... 2001-59166 |
| Sep. 24, 2001 | (KR) | .......... 2001-59167 |
| Oct. 10, 2001 | (KR) | .......... 2001-62528 |
| Oct. 16, 2001 | (KR) | .......... 2001-63683 |

(51) Int. Cl.[7] .......................... H04K 3/00; G08K 1/01; B60K 31/00
(52) U.S. Cl. .................. 342/20; 340/936; 180/170
(58) Field of Search ................ 342/20; 340/936; 180/170

(56) References Cited

U.S. PATENT DOCUMENTS

| 4,182,990 A | * | 1/1980 | Coffin et al. ............. 340/600 |
| 4,630,054 A | * | 12/1986 | Martinson ..................... 342/20 |
| 4,688,005 A | * | 8/1987 | Kipnis ..................... 331/117 R |
| 4,698,632 A | * | 10/1987 | Baba et al. .................... 342/17 |
| 5,315,302 A | * | 5/1994 | Katsukura et al. ............. 342/20 |
| 6,127,962 A | * | 10/2000 | Martinson ..................... 342/20 |

* cited by examiner

*Primary Examiner*—Thomas H. Tarcza
*Assistant Examiner*—Brian K Andrea
(74) *Attorney, Agent, or Firm*—Duane Morris LLP

(57) ABSTRACT

A radar detector includes an antenna for receiving a first signal of ultrahigh-frequency, a first local oscillator oscillating a second signal, a first filter removing noise from the second signal oscillated via the first local oscillator, a first mixer mixing the first signal of ultrahigh-frequency with a third signal filtered via the first filter, an intermediate frequency amplifier amplifying a fourth signal mixed at the first mixer, a second local oscillator oscillating a fifth signal, a second mixer mixing a sixth signal amplified via the intermediate frequency amplifier with the fifth signal oscillated by the second local oscillator, a second filter filtering a seventh signal mixed at the second mixer, a demodulator converting analog values of an eighth signal filtered by the second filter into digital values, a memory part storing data of relations between a ninth signal converted via the demodulator and the second and fifth signals oscillated by the first and second local oscillators, a central processing unit controlling the first and second local oscillators and obtaining a result by comparing the ninth signal converted via the demodulator with the data of the memory part, and an indicator showing a user the result obtained by the central processing unit, wherein the first mixer is made of a transistor including a gate terminal getting the first signal of ultrahigh frequency received via the antenna, a drain terminal receiving the second signal amplified via the second amplifier, and a source terminal being grounded.

14 Claims, 10 Drawing Sheets

RADAR DETECTOR

This application claims the benefit of Korean Patent Application Nos. 2001-59165 filed on Sep. 24, 2001, 2001-59166 filed on Sep. 24, 2001, 2001-59167 filed on Sep. 24, 2001, 2001-62528 filed on Oct. 10, 2001, and 2001-63683 filed on Oct. 16, 2001, which are hereby incorporated by reference for all purposes as if fully set forth herein.

BACKGROUND OF THE INVENTION

1. Field of the Invention

The present invention relates to a radar detector that detects a speed detection system.

2. Discussion of the Related Art

A speed detecting system such as a speed gun is a device that measures the velocity of a moving object by sending out a continuous radio wave and measuring the frequency of reflected wave. Recently, a radar detector, which can detect the speed detecting system, is developed. The radar detector informs a car driver of the presence of the speed gun by detecting laser beam or ultrahigh-frequency wave from the speed gun and converting it into phonetic signs, letters or acoustic signals. The radar detector, generally, utilizes microwave or laser beam.

A conventional radar detector will be described hereinafter in detail with reference to attaching figures.

FIG. 1 is a schematic diagram of showing a principle of a conventional radar detector. As shown in FIG. 1, laser beam or ultrahigh-frequency wave is shot at a driving car from a speed gun (not shown). The frequency of the ultrahigh-frequency wave from the speed gun may be 10.525 GHz, 24.15 GHz, or 34.7 GHz, which are frequencies in X-band (10.525 GHz±25 MHz), K-band (24.150 GHz±100 MHz), and Ka-band (34.7 GHz±1.3 GHz), respectively. The speed gun also emits a VG-2 signal, which is a signal for sensing a radar detector of cars. Then, a radar detector detects the laser beam, ultrahigh-frequency wave, or VG-2 signal, and informs a car driver of the presence of the speed gun. The radar detector also transmits jammer or an anti VG-2 signal in order to interfere with signals from the speed gun.

On the other hand, the radar detector provides a car driver with driving information by sensing signals from sensors of railway crossings, foggy regions, or deceleration regions.

FIG. 2 is a block diagram of a conventional radar detector. In FIG. 2, a radar detector includes an antenna 10, a first local oscillator 20, a first filter 30, a first mixer 40, an intermediate frequency amplifier 50, a second local oscillator 60, a second mixer 70, a second filter 80, a demodulator 90, a central processing unit (CPU) 100, a memory part 110, and an indicator 120.

As shown in the figure, high frequency signal from a speed gun (not shown) received by the antenna 10, which is a born antenna, is input into the first mixer 40. At the first mixer 40, the received high frequency signal is mixed with the output signal of the first local oscillator 20, which is a local voltage controlling oscillator. A radar detector using the local voltage controlling oscillator has advantages such as low power consumption and high sensitivity. At this time, in the output signal of the first local oscillator 20, signal of a predetermined band, i.e. noise, is removed via the first filter 30 between the first local oscillator 20 and the first mixer 40. The output signal of the first mixer 40 is amplified by the intermediate frequency amplifier 50, and input to the second mixer 70. At the second mixer 70, the amplified signal is mixed with the output signal from the second local oscillator 60, and modulated to frequency of tie output signal. Next, only the signal of a desired frequency band is taken out via the second filter 80 from the output of the second mixer 70, and then input into the demodulator 90. At the demodulator 90, the input signal is converted from analog values to digital values in order to be input into the CPU 100.

The CPU 100 controls the oscillators 20 and 60 by generating signal, and selects specific signals by comparing the demodulated signals via the demodulator 90 with the data of the memory part 110. The data of the memory part 110 shows relations of frequencies of the ultrahigh-frequency waves received by the antenna 10 and frequencies oscillating via the first and second local oscillators 20 and 60.

The selected result from the CPU 100 is transmitted to a user by sound or a flickering lamp of the indicator 120.

In this radar detector, a beam-lead diode, which can be used in a broadband region, may be used as a first mixer 40 of FIG. 2. FIG. 3 shows the structure of the beam-lead diode of the conventional radar detector. As shown in FIG. 3, the beam-lead diode is made of two diodes, each of which is a Schottky diode. The Schottky diode is a device rectifying alternating currents (AC) by a Schottky barrier, which is a potential barrier between a metal and a semiconductor contacting each other. In such Schottky diode, there is Schottky effect that emission of electrons increases when electric field is applied at the metal, which is emitting thermoelectrons.

FIG. 4 is a circuit diagram of showing a part of a conventional radar detector including a beam-lead diode as a mixer. In FIG. 4, the beam-lead diode 45 mixes the output signal of the antenna 10 of FIG. 2 with the output signal of the first local oscillator 20, which is controlling 5.8 GHz waves, and transmits the mixed signal into the intermediate frequency amplifier 50 of FIG. 2.

FIGS. 5A, 5B, and 5C are graphs of output from a first mixer versus signals of X-band (10.525 GHz), K-band (24.15 GHz), and Ka-band (34.7 GHz) received by the antenna 10 of FIG. 2, respectively, in a conventional radar detector including a beam-lead diode. At this time, output of the first local oscillator 20 of FIG. 2, which is mixed with the received signal by the antenna 10 of FIG. 2, has frequency of 11.49 GHz, 11.665 GHz, and 11.36 GHz.

The radar detector is arranged at a distance of 5 cm from a system of generating initial signal. The system uses Agilent 8722ES Network Analyzer to generate signal of X-band frequency. The signal of X-band, for example 10.525 GHz, is received by the antenna 10, and is mixed with output 11 of 11.49 GHz of the first local oscillator 20 at the beam-lead diode 40 of FIG. 2. The nixed signal is measured by 8566A Spectrum Analyzer of Hewlett Packard and is illustrated in FIG. 5A.

By the above method, signals of K-band and Ka-band are also mixed and illustrated in FIGS. 5B and 5C, respectively.

However, in FIGS. 5A, 5B, and 5C, the output of the beam-lead diode 40 of FIG, 2, i.e. the mixed signal, is unstable and output of power is very small as −38.91 dBm, −39.90 dBm, and −42.98 dBm. The dBm is a unit of power, and 0 dBm is defined as 1 mW at impedance of 50 ohms.

On the other hand, the beam-lead diode as a first mixer should have small capacitance from Schottky contact in order to be used in 30 GHz to 300 GHz band region. Resistance in series from Schottky contact, also, should be small.

The beam-lead diode has to be connected to other elements of the radar detector by packaging, and thus capacitance from the packaging should be small, too. As the packaging of the beam-lead diode has a size of less than 0.5 mm, it is impossible to make the packaging by hand or by surface mount. Therefore, beam-lead of the beamn-lead diode is formed by setting lead on a substrate, and the process needs an expensive apparatus.

Moreover, in the conventional radar detector, the output from the first local oscillator 20 of FIG. 2 has bad characteristics. FIG. 6 is a graph of the output from a first local oscillator in a conventional radar detector. The data of FIG. 6 is simulated by Advanced Design System program of the Hewlett Packard. In FIG. 6, the output of the first local oscillator is unstable in about 12.195 GHz band. That is, since the conventional radar detector does not receive signals in various bands, it is difficult to use the conventional radar detector in broadband region.

SUMMARY OF THE INVENTION

Accordingly, the present invention is directed to a radar detector that substantially obviates one or more of problems due to limitations and disadvantages of the related art.

An advantage of the present invention is to provide a radar detector that is manufactured easily and that manufacturing expenses are low.

Another advantage of the present invention is to provide a detector that can be used in a broadband region and has a stable output signal.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a radar detector includes an antenna for receiving a first signal of ultrahigh-frequency, a first local oscillator oscillating a second signal, a first filter removing noise from the second signal oscillated via the first local oscillator, a first mixer mixing the first signal of ultrahigh-frequency with a third signal filtered via the first filter, an intermediate frequency amplifier amplifying a fourth signal mixed at the first mixer, a second local oscillator oscillating a fifth signal, a second mixer mixing a sixth signal amplified via the intermediate frequency amplifier with the fifth signal oscillated by the second local oscillator, a second filter filtering a seventh signal mixed at the second mixer, a demodulator converting analog values of all eighth signal filtered by the second filter into digital values, a memory part storing data of relations between a ninth signal converted via the demodulator and the second and fifth signals oscillated by the first and second local oscillators, a central processing unit controlling the first and second local oscillators and obtaining a result by comparing the ninth signal converted via the demodulator with the data of the memory part, and an indicator showing a user the result obtained by the central processing unit, wherein the first mixer is made of a transistor including a gate terminal getting the first signal of ultrahigh frequency received via the antenna, a drain terminal receiving the second signal amplified via the second amplifier, and a source terminal being grounded.

It is to be understood that both the foregoing general description and the following detailed description are exemplary and explanatory and are intended to provide further explanation of the invention as claimed.

BRIEF DESCRIPTION OF THE DRAWING

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to the illustrated embodiment of the present invention, which is illustrated in the accompanying drawings.

Figure 1:
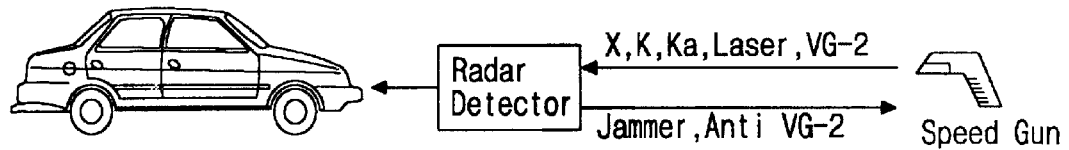
FIG. 1 is a schematic diagram of showing a principle of a conventional radar detector.
Figure 2:
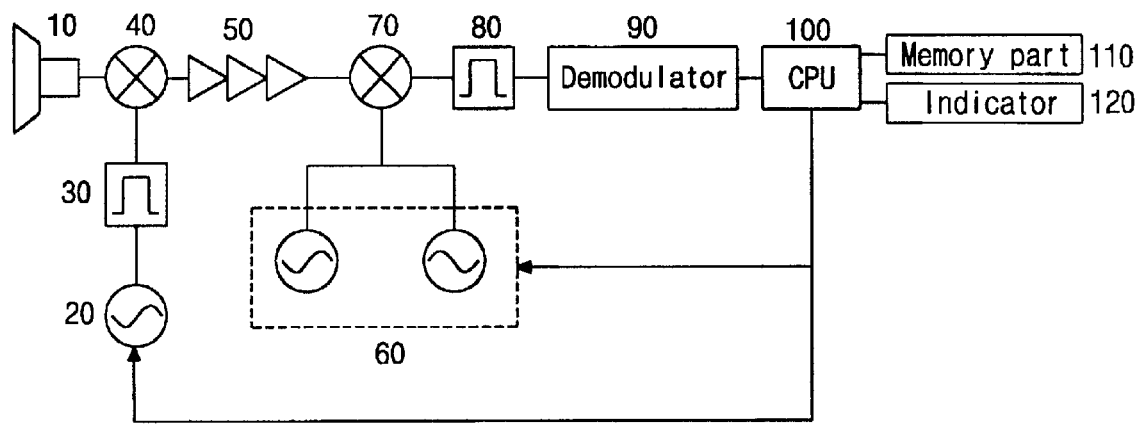
FIG. 2 is a block diagram of a conventional radar detector.
Figure 3:
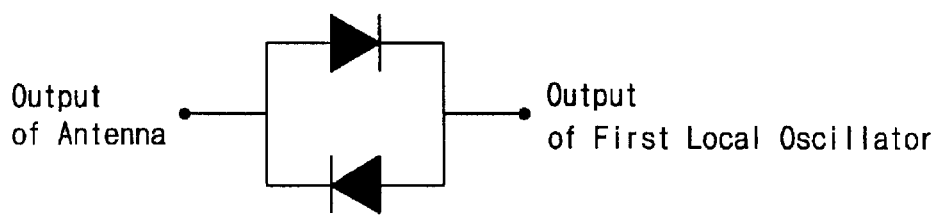
FIG. 3 is a circuit diagram showing a beam-lead diode of the conventional radar detector.
Figure 4:
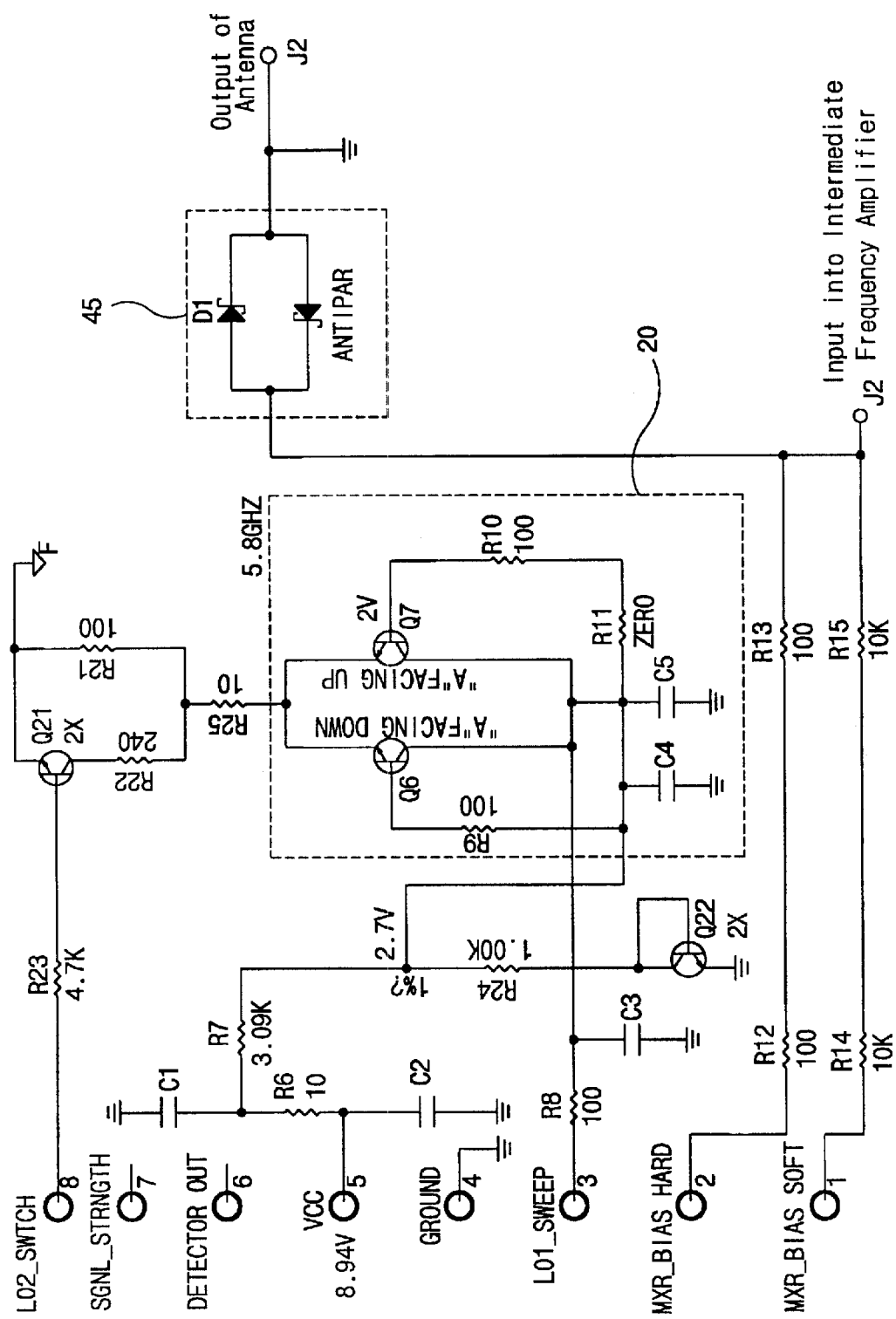
FIG. 4 is a circuit diagram of showing a part of a conventional radar detector including a beam-lead diode.
Figure 7:
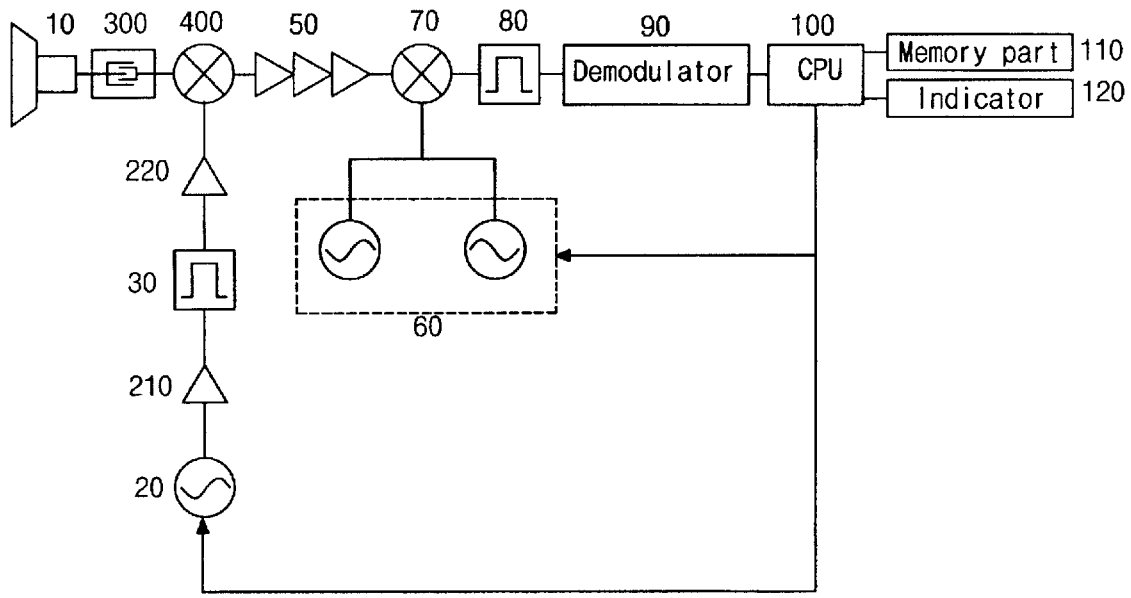
FIG. 7 is a block diagram of a radar detector according to the present invention.

FIG. 7 is a block diagram of a radar detector according to the present invention. In the radar detector of FIG. 7, the same symbol used in FIG. 2 is given to the same part as the conventional radar detector of FIG. 2.

As shown in FIG. 7, a radar detector includes an antenna 10 receiving ultrahigh-frequency signal, a first local oscillator 20 generating frequencies, a first amplifier 210 amplifying signal, a first filter 30 removing noise of signal, a second amplifier 220, a coupler 300 blocking direct currents, a first mixer 400 mixing signals of different frequencies, an intermediate frequency amplifier 50 amplifying signals, a second local oscillator 60, a second mixer 70, a second filter 80 selecting signal in a specific band, a demodulator 90 converting analog values to digital values, a central processing unit (CPU) 100, a memory part 110, and an indicator 120.

High frequency signal from a speed gun (not shown) received by the antenna 10, which is a horn antenna, is input into the first mixer 400. The antenna 10 can receive ultrahigh-frequency wave of about 10.525 GHz (X-band), about 24.150 GHz (K-band), or about 34.7 GHz±1.3 GHz (Ka-band). The antenna 10 also can receive a VG-2 signal, which is a signal for sensing a radar detector of cars. The signal received by the antenna 10 is input into the first mixer 400 after DC components are removed via the coupler 300.

On the other hand, another signal, which is generated to have specific frequency by the first oscillator 20, first amplified by the first amplifier 210, filtered at the first filter 30 in order to remove signal of a predetermined band, i.e. noise, and second amplified by the second amplifier 220, is input into the first mixer 400. The first local oscillator 20 is a local voltage controlling oscillator.

Next, at the first mixer 400, the signal via the coupler 300 is mixed with the output signal of the second amplifier 220. The frequency of the signal through the first mixer 400 corresponds to the difference of the frequencies of the mixed signals.

The output signal of the first mixer 400 is amplified by the intermediate frequency amplifier 50, and input to the second mixer 70. At the second mixer 70, the amplified signal is mixed with the output signal from the second local oscillator 60, and modulated to frequency of the output signal. Next, only the signal of a desired frequency band is taken out via the second filter 80 from the output of the second mixer 70, and then input into the demodulator 90. At the demodulator 90, the input signal is converted from analog values to digital values in order to be input into the CPU 100.

The CPU 100 controls the oscillators 20 and 60 by generating signal, and selects specific signals by comparing the demodulated signals via the demodulator 90 with the data of the memory part 110. The data of the memory part 110 shows relations of frequencies of the ultrahigh-frequency waves received by the antenna 10 and frequencies oscillating via the first and second local oscillators 20 and 60.

The selected result from the CPU 100 is transmitted to a user by sound or a flickering lamp of the indicator 120.

Here, the first mixer 400 of FIG. 7 is made of a transistor including a gate terminal, a source terminal and a drain terminal. The structure of this first mixer 400 is illustrated in FIG. 8.

Figure 8:
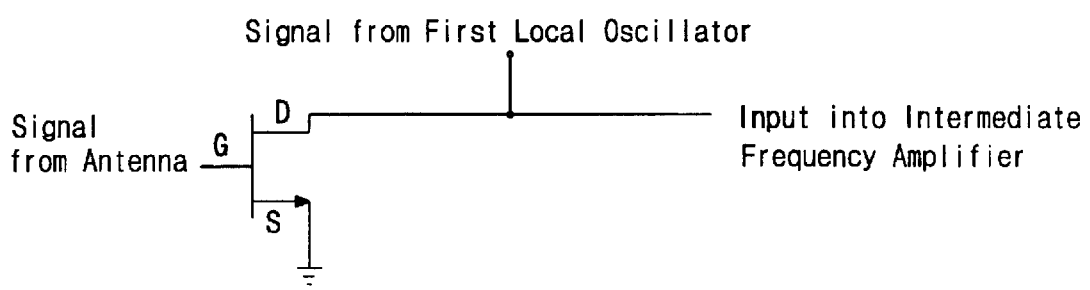
FIG. 8 is a circuit diagram of a transistor used as a first mixer of a radar detector according to the present invention.

FIG. 8, the gate terminal "G" receives the signal from the antenna 10 of FIG. 7, the source terminal "S" is grounded, and the drain terminal "D" receives the signal from the first oscillator 20 of FIG. 7. Subsequently, the signal mixed at the transistor 400, i.e. the first mixer, is input into the intermediate frequency amplifier 50 of FIG. 7 via the drain terminal "D".

Figure 9:
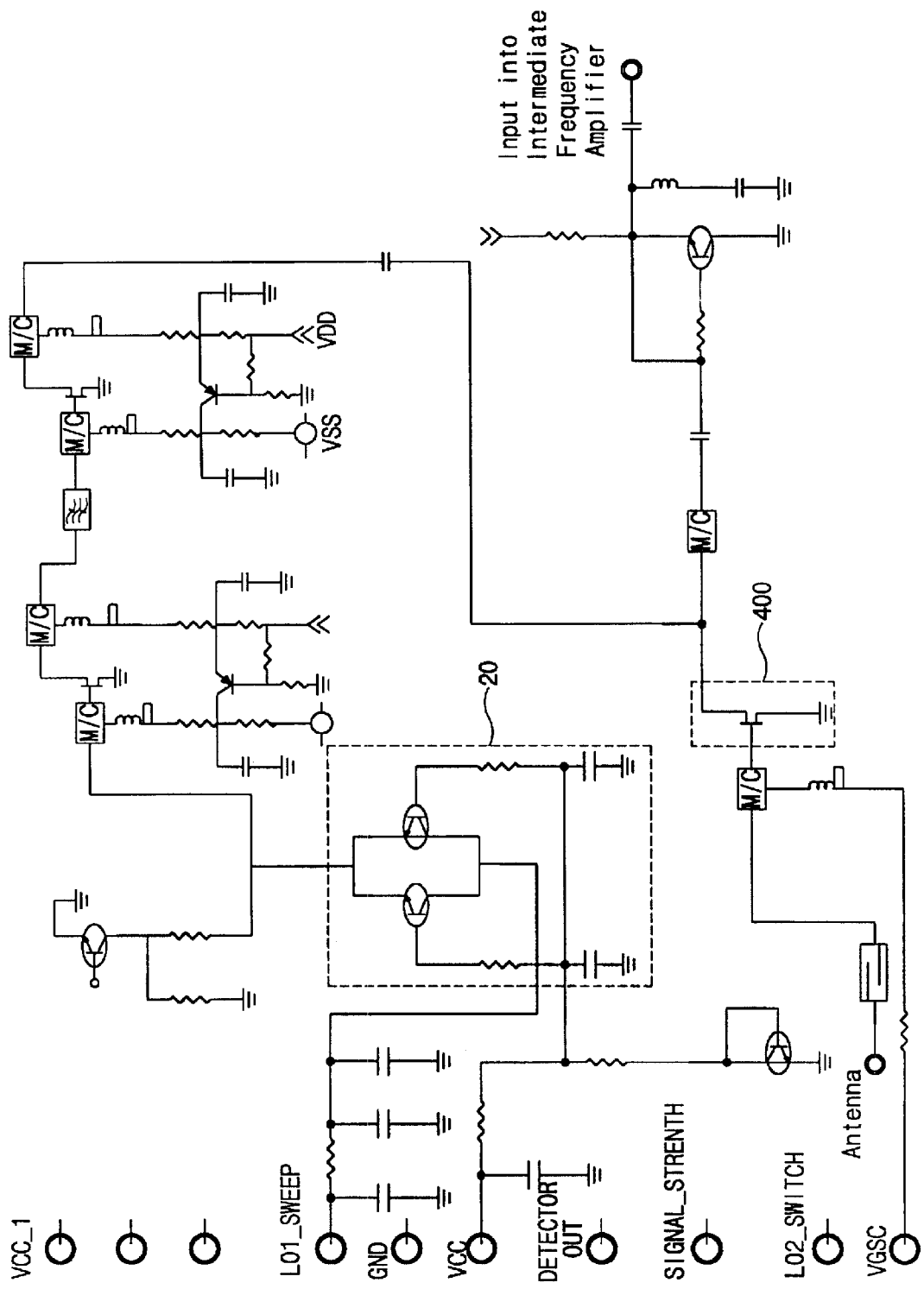
FIG. 9 is a circuit diagram of showing a pant of a radar detector according to the present invention.

The transistor may be made of one of a field effect transistor (FET) and a high electron mobility transistor (HEMT). The high electron mobility transistor (HEMT) uses 2-dimensional electronic gas, which is generated at the interface of AlGaAs and GaAs including donors of high density, as a channel of the transistor. The high electron mobility transistor (HEMT) has an object to operate in high frequency, low noise, and high power. FIG. 9 is a circuit diagram of showing a part of a radar detector that has a high electron mobility transistor (HEMT) as a first mixer 400. As the transistor 400 can be connected to other elements of the radar detector by using a surface mounted device (SMD), it costs low expenses to manufacture the radar detector having a transistor as a mixer.

Figure 10:
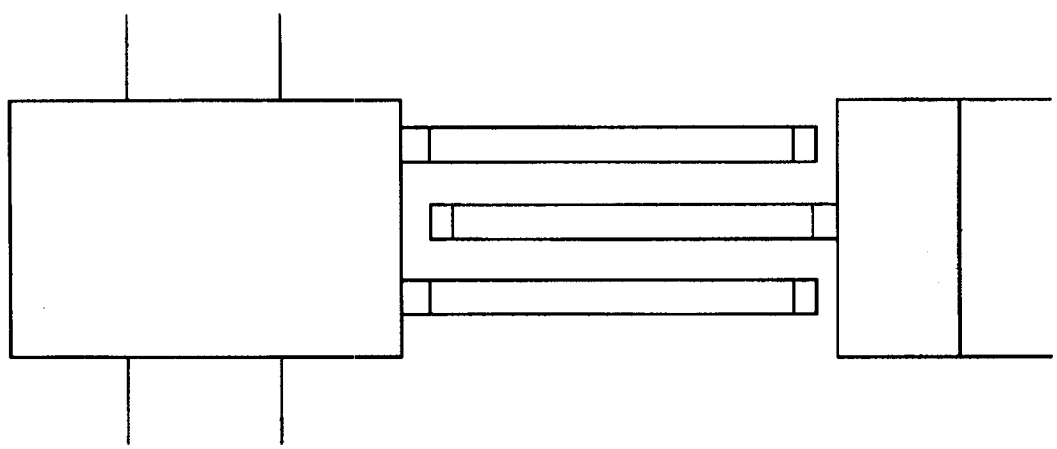
FIG. 10 is a schematic diagram of a coupler of a radar detector according to the present invention.

On the other hand, as stated before, the radar detector of the present invention includes a coupler 300 of FIG. 7 in order to detect a signal in a broadband region. The structure of the coupler, which is a 2X1 type, is illustrated in FIG. 10. The coupler 300 distributes signals and monitors them. The length of the coupling part of the coupler 300 is ¼ wavelength of central frequency. The coupler of FIG. 10, which acts as a condenser, includes a connected couple of electrodes and another electrode with an alternating arrangement. The coupler has a broad pass-band, which is a frequency band that signals can pass through without attenuation, and also decreases attenuation of signals in a pass-band if possibly there is attenuation.

Figure 11:
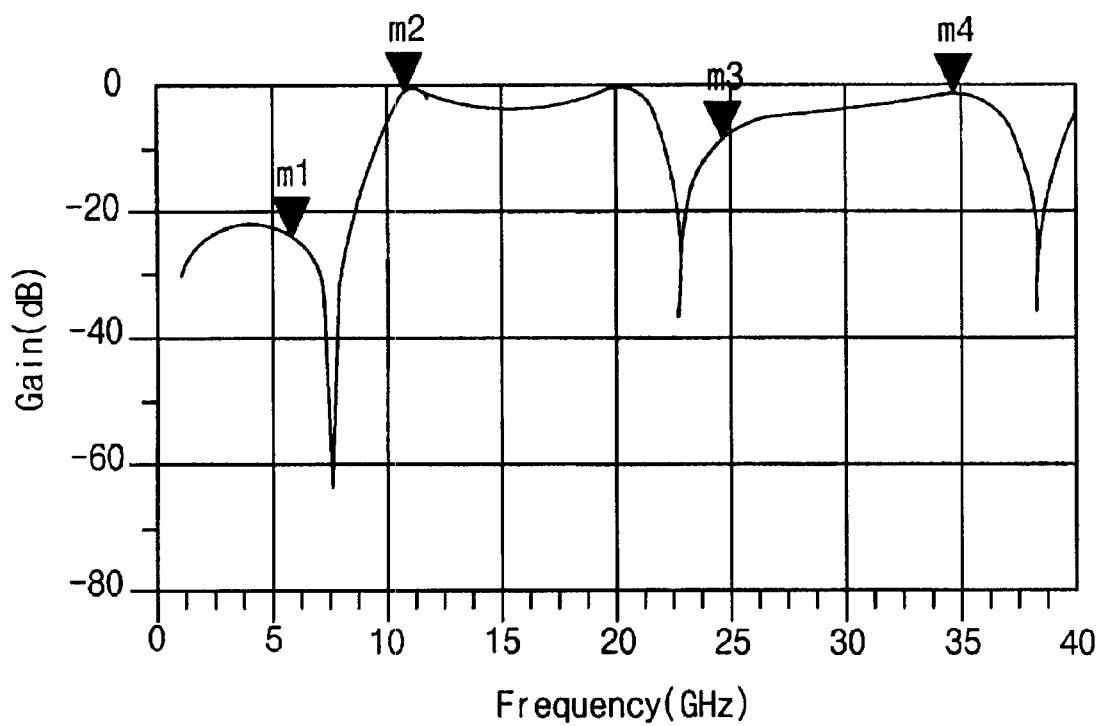
FIG. 11 is a graph of output from a coupler of a radar detector according to the present invention.

FIG. 11 is a graph of output from a coupler of a radar detector according to the present invention. The test is taken by using Advanced Design System program of Hewlett Packard, and the result is expressed at 100 MHz intervals in 1 GHz to 40 GHz region. At this time, impedance of 50 ohms is applied between both pads of the coupler. In FIG. 11, points m2, m3, and m4 show gain distributions versus signals of X-band (10.70 GHz), K-band (24.60 GHz), and Ka-band (34.50 GHz) from the speed gun, respectively.

The gain is calculated as dB=10log(output/input). For example, in an amplifier that has input of 1W and output of 100W, the amplifier has gain of 20 dB because 10log(100/1) equals 20. On the other side, in an attenuator that has input of 100W and output of 15W, the attenuator has gain of −8.23 dB because 10log(15/100) is −0.823. If signal is amplified, gain becomes positive value, and if attenuated, gain becomes negative value.

The gains at the points m2(−1.704 dB), m3(−7.748 dB), and m4(−0.912 dB) approximate zero, and it means that signals can pass through without attenuation. Therefore, a loss of the signal decreases by the coupler, and the radar detector including the coupler can detect the signals in a broadband region.

Meanwhile, the radar detector includes the first amplifier 210 and the second amplifier 220 of FIG. 7 to make the output of the first local oscillator 20 of FIG. 7 unstable. Here, it is desirable that the first and second amplifiers 210 and 220 have output gain of over 15 dB.

In the radar detector, the first local oscillator 20, which is a local voltage controlling oscillator, controls signal of 5.8 GHz and generates signal of about 10.963 GHz to 11.863 GHz, which is about twice frequency of 5.8 GHz. The first amplifier 210 amplifies the signal of about 10.963 GHz to 11.863 GHz. At this time, gain of the first amplifier 210 desirably is over 15 dB. Next, the first filter 30 removes signal of about 5.8 GHz from the signal amplified via the first amplifier 210. The signal via the first filter 30 is input into the second amplifier 220, is amplified, and is saturated in the region of about 10.963 GHz to 11.863 GHz. Here, the second amplifier 220 should have gain of over 18 dB in order to make the amplified signal stable.

Figure 6:
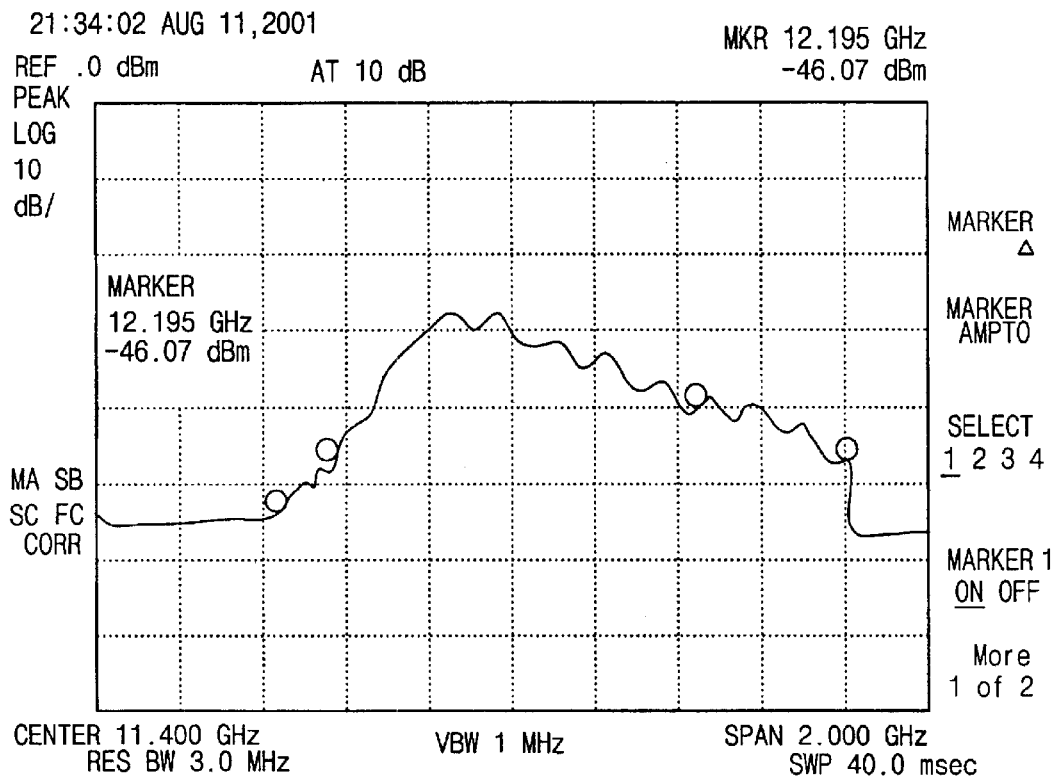
FIG. 6 is a graph of output from a first local oscillator in a conventional radar detector.
Figure 12:
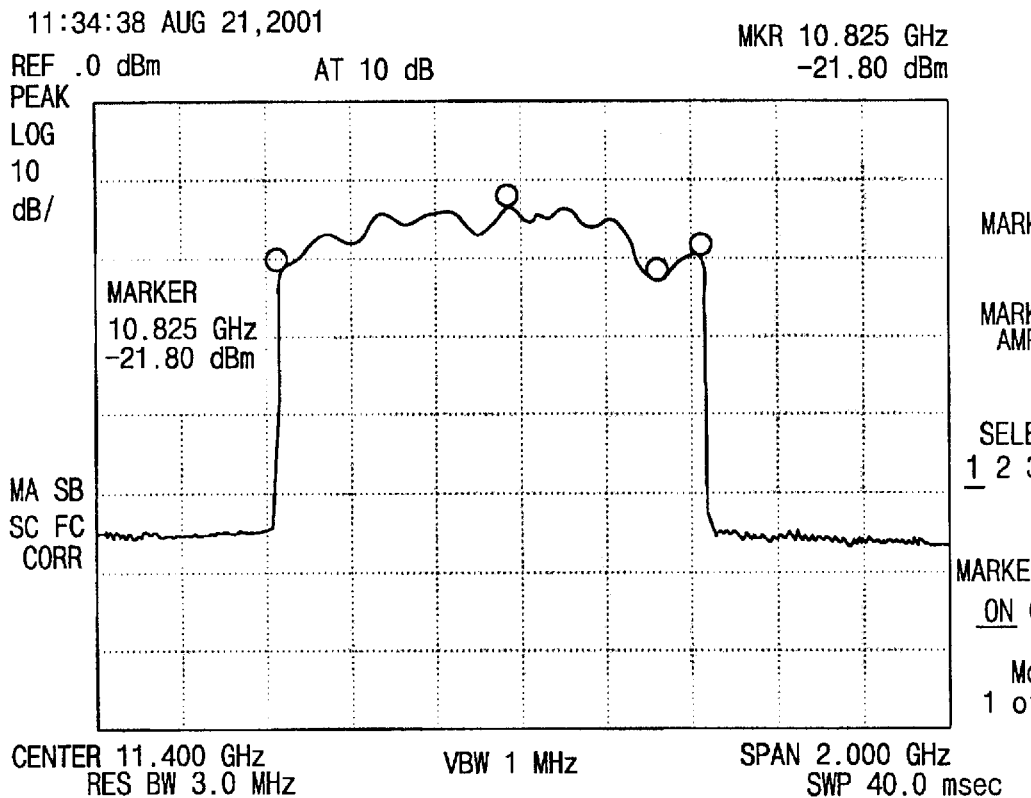
FIG. 12 is a graph of signal input from a first local oscillator into a first mixer in a radar detector according to the present invention.

FIG. 12 is a graph of signal, which is saturated by being amplified by the first and second amplifier, input from a first local oscillator into a first mixer in a radar detector according to the present invention. In FIG. 12, the signal is measured by 8593B Spectrum Analyzer of Hewlett Packard. Because of the first and second amplifiers 210 and 220, the data of FIG. 12 is stable compared with the data of FIG. 6 according to the prior art and shows oscillating in broadband region.

Figure 13A:
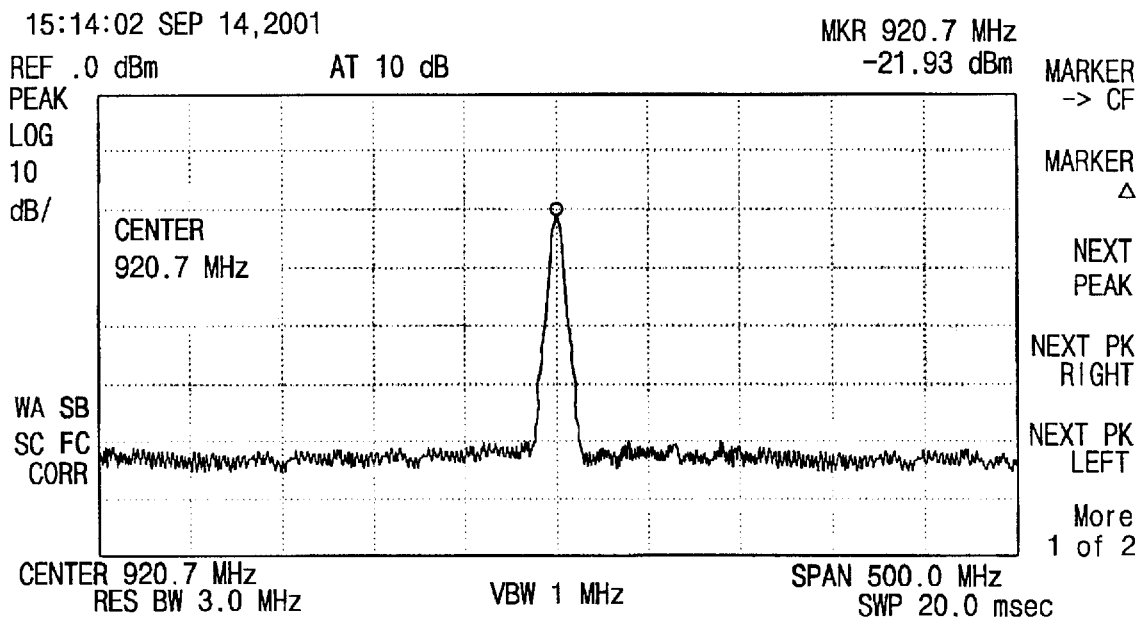
FIGS. 13A, 13B, and 13C are graphs of output from a first mixer versus X-band, K-band, and Ka-band, respectively, in a radar detector according to the present invention.
Figure 13B:
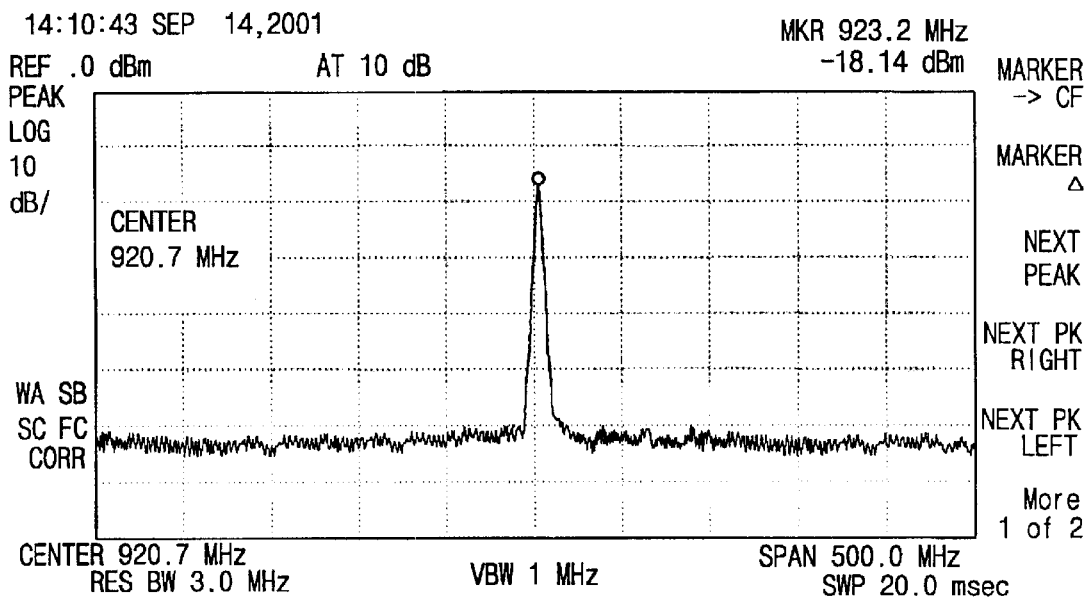
Figure 13C:
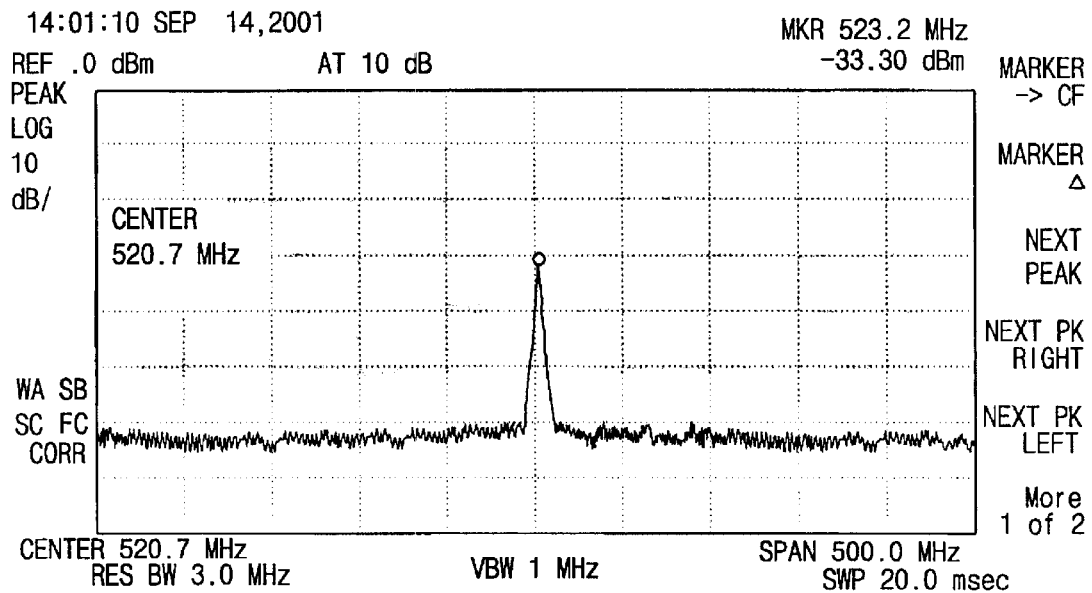

Next, FIGS. 13A, 13B, and 13C are graphs of output from a first mixer, which is made of a transistor, versus X-band, K-band, and Ka-band, respectively, in a radar detector according to the present invention. That is, the output from the first mixer is a result that the signal received by the antenna 10 of FIG. 7 is mixed with the signal through the second amplifier 220 of FIG. 7 from the first local oscillator 20 of FIG. 7 via the coupler 300 of FIG. 7. The data of FIGS. 13A to 13C is stable in comparison with the data of FIGS. 5A to 5C.

Figure 5A:
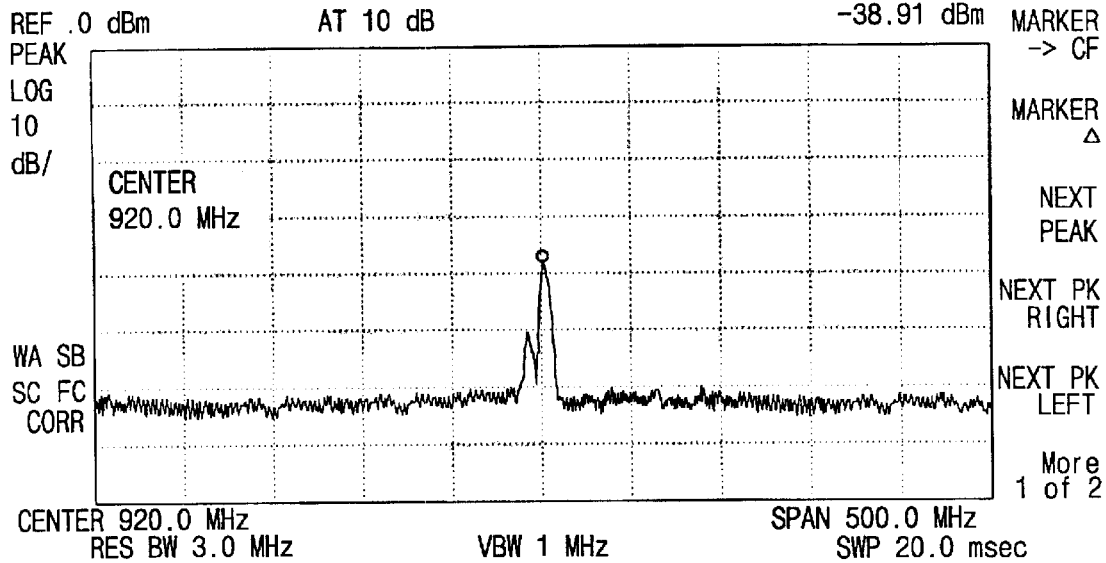
FIGS. 5A, 5B, and 5C are graphs of output from a first mixer versus signal of X-band, K-band, and Ka-band, respectively, in a conventional radar detector including a beam-lead diode.
Figure 5B:
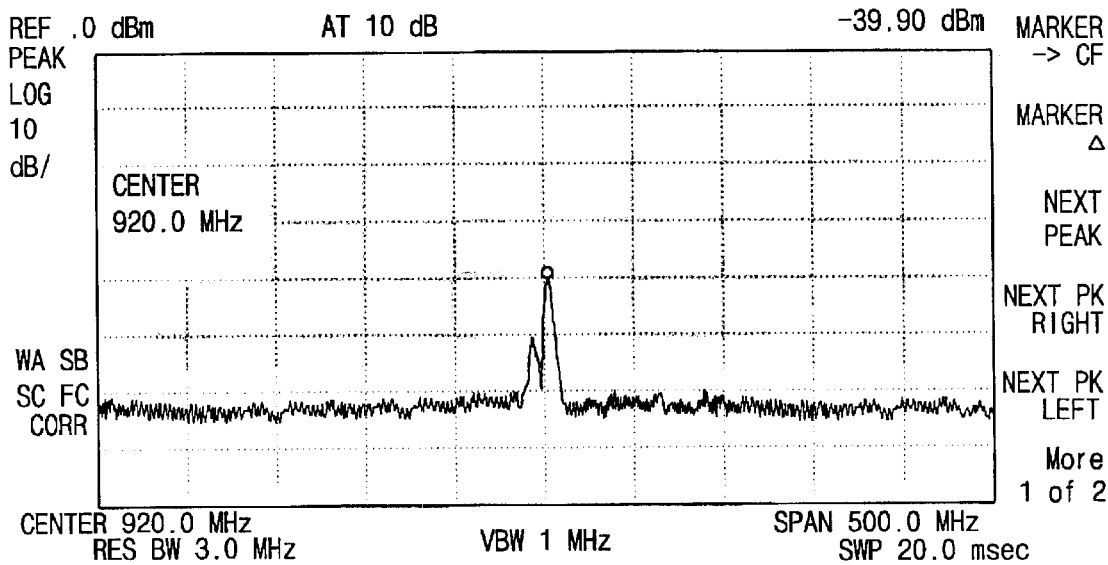
Figure 5C:
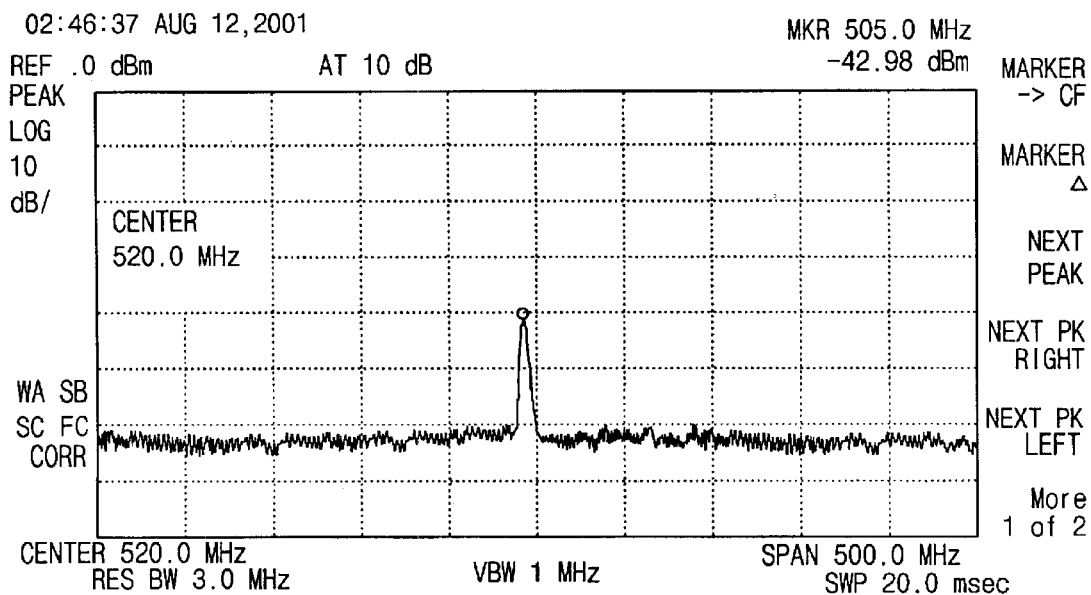

Besides, the first mixer has gains of −21.93 dB, −18.14 dB, and −33.30 dB to signal in X-band, K-band, and Ka-band, respectively, and the gains are bigger than that of FIGS. 5A to 5C.

Figure 14:
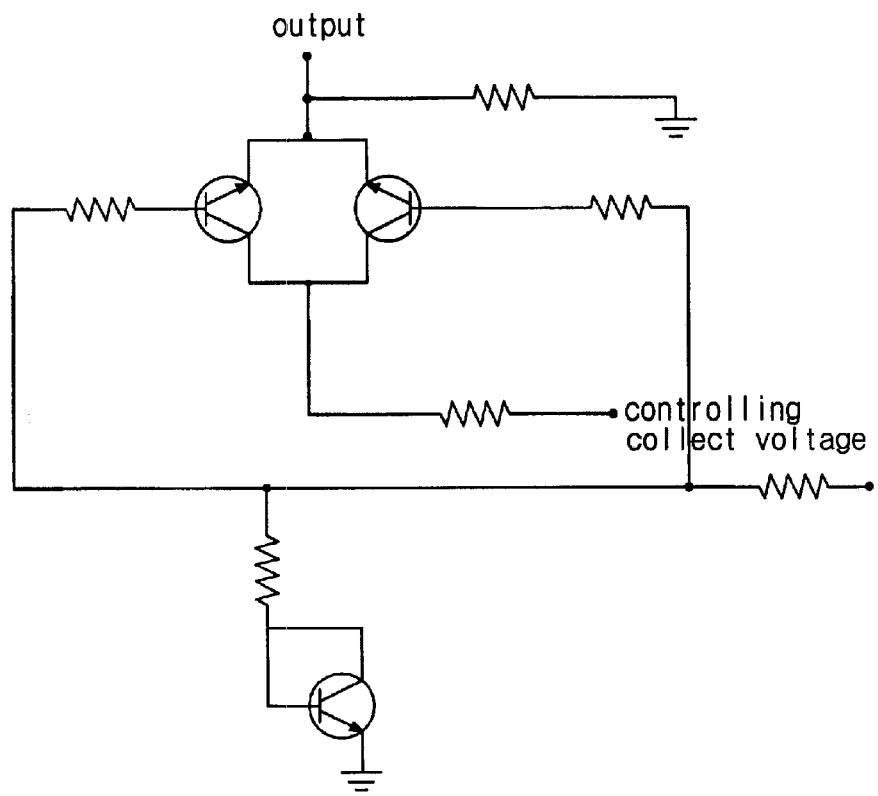
FIG. 14 is a circuit diagram of a first local oscillator of a radar detector according to the present invention.

In the meantime, the first local oscillator 20 of FIG. 7, a collector of which is controlled, may be used. The first local oscillator is illustrated in FIG. 14. As shown in FIG. 14, the first local oscillator includes parallel transistors, each of which is composed of an emitter, a collector, and a base. In the first local oscillator of the present invention, the collectors of the transistors are controlled by the data of the CPU 100 of FIG. 7. Therefore, the circuit structure of the first local oscillator becomes simple in contrary to a related art first local oscillator, a base of which is controlled.

Figure 15:
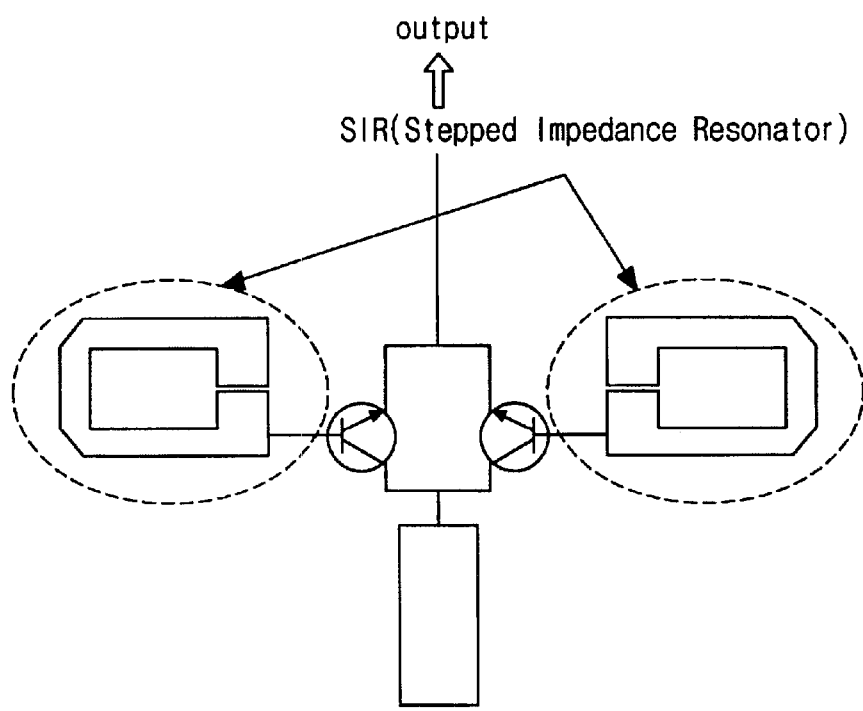
FIG. 15 is a schematic view of showing a first local oscillator of a radar detector according to the present invention.

Additionally, the first local oscillator includes a resonator, and in the present invention, the resonator may be a stepped impedance resonator (SIR). The first local oscillator including stepped impedance resonators is schematically illustrated in FIG. 15. The stepped impedance resonators are connected to bases of transistors. As the stepped impedance resonator has a high resonating ratio, the first local oscillator can generate a signal having no noises and being in various frequency bands.

It will be apparent to those skilled in the art that various modifications and variations can be made in the fabrication and application of the present invention without departing from the spirit or scope of the invention. Thus, it is intended that the present invention cover the modifications and variations of this invention provided they come within the scope of the appended claims and their equivalents.

What is claimed is:

1. A radar detector, comprising:

an antenna for receiving a first signal of ultrahigh-frequency;

a first local oscillator oscillating a second signal;

a first filter removing noise from the second signal oscillated via the first local oscillator;

a first mixer mixing the first signal of ultrahigh-frequency with a third signal filtered via the first filter;

an intermediate frequency amplifier amplifying a fourth signal mixed at the first mixer;

a second local oscillator oscillating a fifth signal;

a second mixer mixing a sixth signal amplified via the intermediate frequency amplifier with the fifth signal oscillated by the second local oscillator;

a second filter filtering a seventh signal mixed at the second mixer;

a demodulator converting analog values of an eighth signal filtered by the second filter into digital values;

a memory part storing data of relations between a ninth signal converted via the demodulator and the second and fifth signals oscillated by the first and second local oscillators;

a central processing unit controlling the first and second local oscillators, and obtaining a result by comparing the ninth signal converted via the demodulator with the data of the memory part; and an indicator showing a user the result obtained by the central processing unit, wherein the first mixer is made of a transistor including a gate terminal getting the first signal of ultrahigh frequency received via the antenna, a drain terminal receiving the third signal, and a source terminal being grounded—to clear up a lack of antecedent basis problem.

2. The radar detector according to claim 1, wherein the transistor is one of a field effect transistor and a high electron mobility transistor.

3. The radar detector according to claim 1, further comprising a frequency selective coupler of the signal received by the antenna.

4. The radar detector according to claim 3, wherein the coupler is 2X1 type.

5. The radar detector according to claim 3, further comprising a first amplifier and a second amplifier, the first amplifier between the first local oscillator and the first filter, the second amplifier between the first filter and the first mixer.

6. The radar detector according to claim 5, wherein gain of the first amplifier is over 15 dB.

7. The radar detector according to claim 6, wherein gain of the second amplifier is over 18 dB.

8. The radar detector according to claim 5, wherein the first local oscillator includes parallel transistors, each transistor being composed of an emitter, a collector, and a base, the collector of the transistor being controlled.

9. The radar detector according to claim 8, wherein the first local, oscillator includes a stepped impedance resonator.

10. The radar detector according to claim 1, further comprising a first amplifier and a second amplifier, the first amplifier between the first local oscillator and the first filter, the second amplifier between the first filter and the first mixer.

11. The radar detector according to claim 10, wherein gain of the first amplifier is over 15 dB.

12. The radar detector according to claim 11, wherein gain of the second amplifier is over 18 b.

13. The radar detector according to claim 1, wherein the first local oscillator includes parallel transistors, each transistor being composed of an emitter, a collector, and a base, the collector of the transistor being controlled.

14. The radar detector according to claim 13, wherein the first local oscillator includes a stepped impedance resonator.

* * * * *